United States Patent [19]

Gully et al.

[11] Patent Number: 5,032,772
[45] Date of Patent: Jul. 16, 1991

[54] MOTOR DRIVER CIRCUIT FOR RESONANT LINEAR COOLER

[76] Inventors: Wilfred J. Gully, 2714 Grand Summit Rd., Torrance, Calif. 90509; Paul M. Okada, 14632 Bowling Green, Westminster, Calif. 92683

[21] Appl. No.: 445,507

[22] Filed: Dec. 4, 1989

[51] Int. Cl.$^5$ .......................... H02K 41/02; F25B 1/02
[52] U.S. Cl. .................... 318/135; 318/132; 318/293; 62/226; 62/228.4
[58] Field of Search ............... 318/119/121, 125, 126, 318/127, 129, 132, 134, 135, 641, 687, 293, 294; 60/524; 62/6, 215, 226, 228.1, 228.4; 310/12, 13, 14, 15, 16, 17, 19, 23, 30, 31, 34, 36, 38, 39; 417/410, 415, 416, 417

[56] References Cited

U.S. PATENT DOCUMENTS

| | | | |
|---|---|---|---|
| 3,610,782 | 10/1969 | McGuire | 417/415 X |
| 3,916,271 | 10/1975 | Watanabe et al. | 318/132 |
| 4,027,211 | 5/1977 | Omura et al. | 318/132 X |
| 4,567,726 | 2/1986 | Vitale et al. | 62/6 X |
| 4,706,470 | 11/1987 | Akazawa et al. | 417/417 X |
| 4,893,479 | 1/1990 | Gillett et al. | 62/228.4 X |

FOREIGN PATENT DOCUMENTS

| | | | |
|---|---|---|---|
| 58-33039 | 2/1983 | Japan | 62/228.4 |
| 60-228836 | 11/1985 | Japan | 62/228.4 |
| 60-251337 | 12/1985 | Japan | 62/228.4 |

*Primary Examiner*—Bentsu Ro
*Attorney, Agent, or Firm*—Terje Gudmestad; W. K. Denson-Low

[57] ABSTRACT

A direct current powered, linear resonant cryocooler having a compressor in which the piston is reciprocated by a linear motor at substantially resonant frequency and the length of stroke of the piston is varied as a direct function of cryocooler temperature. There are two control loops, a temperature control loop and a voltage control loop which is independent of the temperature control loop. In the temperature control loop, temperature is sensed at the cryocooler or expander and the temperature signal is compared with a reference temperature signal to produce a temperature error signal or voltage. The voltage control loop controls motor voltage. As input to the voltage control loop, the linear motor voltage is fed back and compared with the temperature error voltage $V_{TE}$ to produce a voltage level signal $V_L$ in the input of the voltage control loop, representative of the correction required to obtain and then to maintain the cryocooler temperature represented by the reference temperature voltage. Either a pulse width modulated, variable amplitude sine wave signal or a constant duty cycle, pulse width modulated, square wave signal powers the linear motor.

14 Claims, 6 Drawing Sheets

MOTOR DRIVER CIRCUIT FOR RESONANT LINEAR COOLER

TECHNICAL FIELD

This invention relates generally to miniaturized electrically controlled, resonant linear coolers, and more particularly to direct current powered linear coolers together with motor driver circuits therefor.

BACKGROUND OF THE INVENTION

Linear motor compressors and compressor drives are known in the prior art. U.S. Pat. Nos. 3,891,874, 3,937,600, 4,067,667, and 4,345,442 describe linear compressors having provisions for piston stroke control. Applications of such linear compressors include their use in heat pumps, as described in U.S. Pat. No. 4,345,442. These heat pumps are used for space heating and cooling, as in applications in dwellings. U.S. Pat. No. 4,345,442 describes a linear motor drive for the compressor wherein a selectively variable mechanical resonant frequency of the pump is said to be generally centered in the power line frequency of the alternating current power source which is used to drive the linear motor. These patents describe an electrodynamic type of linear oscillating motor for the piston drives in the compressors. These linear motor drives have both AC and DC field coil windings. Usually, a fixed direct current is coupled to the DC field windings over the complete operating range of the motors. An exception to this is described in U.S. Pat. No. 4,291,258 in which a control system is provided which couples a DC coil current to the DC field coils, which is said to be quasi-proportional to the magnitude of the AC field coil current.

While DC is used as field coil current in the systems of these patents, it is not the sole power source. It is used only to provide a DC field with which the AC field interacts. The systems described in these patents are not miniaturized systems and are not adapted for miniaturization, nor are they adapted for use with DC power supplies as the sole power source. Where a DC power supply is used, different techniques for energizing and controlling the linear motor are required. These are neither described nor suggested in the referenced patents.

SUMMARY OF THE INVENTION

Linear compressors are preferred to rotary compressors in miniaturized self-contained cryocoolers because rotary coolers suffer speed limitations in providing temperature control. Improvements in electrically controlled cooling systems are provided according to the present invention in a temperature regulated cooler system employing a variable stroke, linear motor compressor operated at or near resonant frequency of the compressor. The compressor is coupled to the expander. Together, they comprise a Stirling cycle machine. The compressor supplies coolant at differing volume rates as a function of the temperature error measured as the difference between the temperature of the expander, or the coolant temperature at the expander, and a predetermined coolant temperature which is to be obtained.

The compressor piston is coupled to the armature of the linear motor. The stator assembly is connected to the cylinder in which the piston moves. The linear motor is driven by the interaction of the magnetic fields between the permanent magnet and coil, either of which can comprise the armature assembly. In one embodiment of this invention, power to the coil comprises a variable amplitude, substantially sinusoidal current of a constant frequency, at or near the resonant frequency of the compressor, produced by pulse width modulation. The amplitude of the current applied to the winding of the linear motor controls or determines the length of the stroke of the compressor piston. This controls the volume rate at which the coolant is pumped. The amplitude of the sinusoidal current, in turn, is determined by the temperature differential or error noted above.

In a second embodiment of this invention, coil power comprises a low frequency square wave signal of constant amplitude and width which is pulse width modulated at high frequency and constant duty cycle. This is applied to the coil in place of the sine wave signal. The duty cycle of the pulse width modulation of the square wave signal is determined by the temperature error. The duty cycle of the pulse width modulation of the square wave signal determines the length of the stroke of the piston. Thus, the volume rate of the coolant at, or delivered to, the expander is temperature-regulated and is provided by a variable length, piston displacement or stroke at a cyclic rate at or near resonant frequency of the compressor, for efficient operation.

The sinusoidal current at resonant frequency is produced by a sine wave drive. A standard DC power source provides power for the drive. Efficient conversion of the DC power is achieved using pulse width modulation techniques for developing the sinusoidal current. A pulse width modulator is also used to produce the constant duty cycle, pulse width modulated, square wave signal.

In both the sine wave and square wave drives for the linear motor compressor, piston stroke control is achieved by sensing the voltage across the coil of the linear motor and developing the necessary input current for the linear motor, as a function of the difference between the sensed motor voltage and the temperature error voltage. Sensing of the voltage at the coil of the motor is a good, although approximate, measure of the stroke of the armature of the linear motor. This provides piston stroke control, for example with both pulse width modulation techniques, which is independent of the exact value of the voltage level of the DC power provided and with no extra sensor being required on the motor.

A temperature-sensing circuit having a temperature sensor on the cryocooler at the expander, provides a voltage proportional to the existing cryocooler temperature. This is compared with a reference voltage indicative of the desired cryocooler temperature to produce the temperature error voltage.

BRIEF DESCRIPTION OF THE DRAWINGS

A better understanding of the invention may be had by reference to the following descriptive disclosure when considered in conjunction with the accompanying drawings, in which.

DESCRIPTION OF THE PREFERRED EMBODIMENTS

Figures 1, 1A:
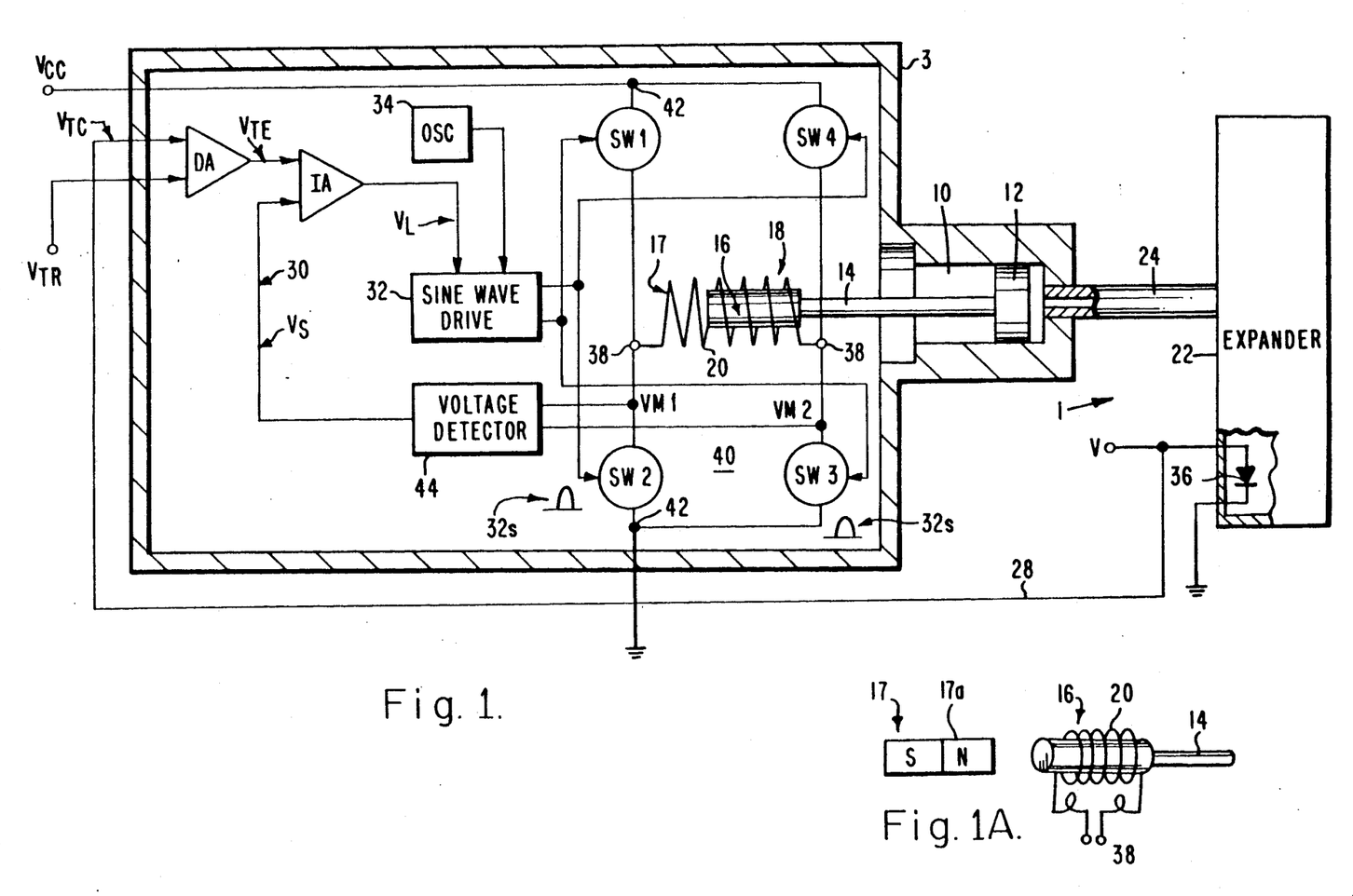
FIG. 1 schematically illustrates a DC powered control system for a cooler having a linear motor compressor, according to one embodiment of this invention.
FIG. 1A illustrates an alternative construction of the linear motor of FIG. 1.

The cryocooler system illustrated in FIG. 1 is a linear resonant cryocooler in which temperature is controlled by varying the volume rate of coolant transfer, using a linear motor drive for the compressor system. The linear motor comprises a stator and an armature mounted for linear movement relative to the stator. Efficiency is obtained by driving the moving parts of the compressor system, comprising the piston and the armature of the linear motor, at resonant frequency. Temperature control of the cryocooler is achieved by varying the stroke of the piston as a function of the temperature error measured as the variation of the coolant temperature, for example, at the expander, from a reference temperature.

The cryocooler system 1 of FIG. 1 comprises a linear motor compressor 3 having a cylinder 10 with a piston 12 therein. A piston rod 14 is connected to an armature 16 of a conventional linear motor, generally designated 18.

The linear motor comprises an armature 16 and a stator 17. As seen in FIG. 1, the armature 16 is a permanent magnet and the stator 17 includes a coil 20. Alternatively, as seen in FIG. 1A, the armature 16 mounts the coil 20 and the stator 17 is a permanent magnet 17a. In either of the linear motors, the direction of stroke of the armature 16 depends upon the polarity of the voltage coupled to the coil 20. By reversing the polarity of this voltage, the armature is caused to reciprocate, which bi-directionally strokes the piston 12 in the compressor cylinder 10 for pumping the coolant. In this embodiment, the piston is stroked at resonant frequency of the compressor system using sinusoidal power, the current of which is varied in amplitude to control the length of the piston stroke and, hence, the volume rate at which the coolant is pumped. The cryocooler 1 typically includes an expander 22 connected by a tube 24 to the output of the compressor 3.

Temperature feedback in a temperature control loop, generally designated 28, is used to control the cryocooler temperature. Rather than change the compressor pumping frequency to achieve temperature control, as in rotary compressor coolers, this linear motor drive changes the length of the stroke of the piston of the compressor at constant frequency, preferably at or near resonant frequency. This is the most efficiency way because the cooler remains mechanically resonant. In addition, there is no limit on the range of compressor piston stroke within the mechanical limits of the length of the stroke, i.e. from minimum stroke, including zero stroke, to the maximum stroke length.

Figure 4:
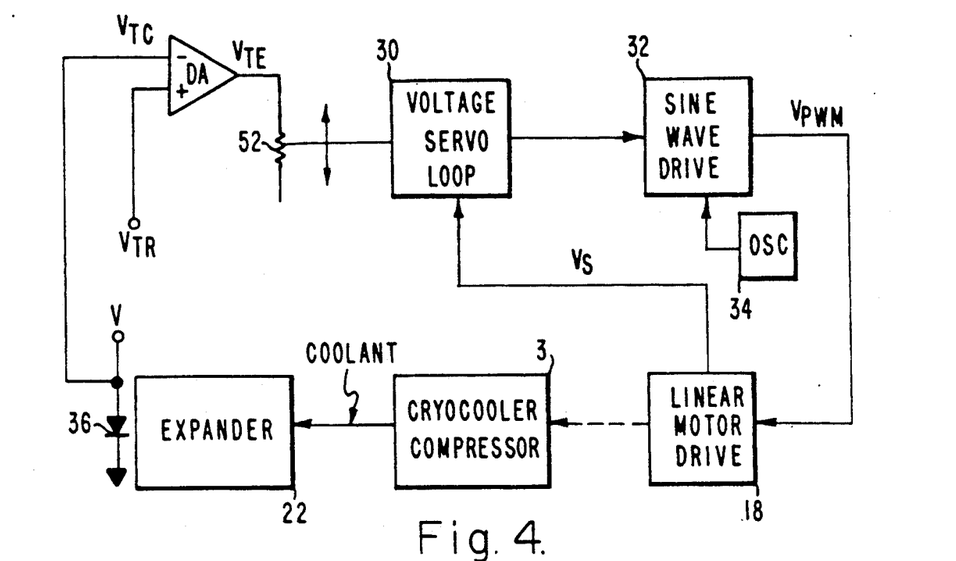
FIG. 4 schematically illustrates the details of a temperature control circuit, employed in this invention.

Voltage feedback in a voltage control loop, generally designated 30, controls the temperature while accommodating changes of input voltage. These functions, temperature and voltage control, are independent. Keeping these functions independent enhances the performance of both functions. Voltage control, as will be seen in FIG. 4, is implemented with only a single adjustment. Voltage control is nearly equivalent to stroke control for an efficient linear motor at resonance. Its advantage is that it requires no extra sensor such as a sensor which measures the length of the stroke.

Figure 2:
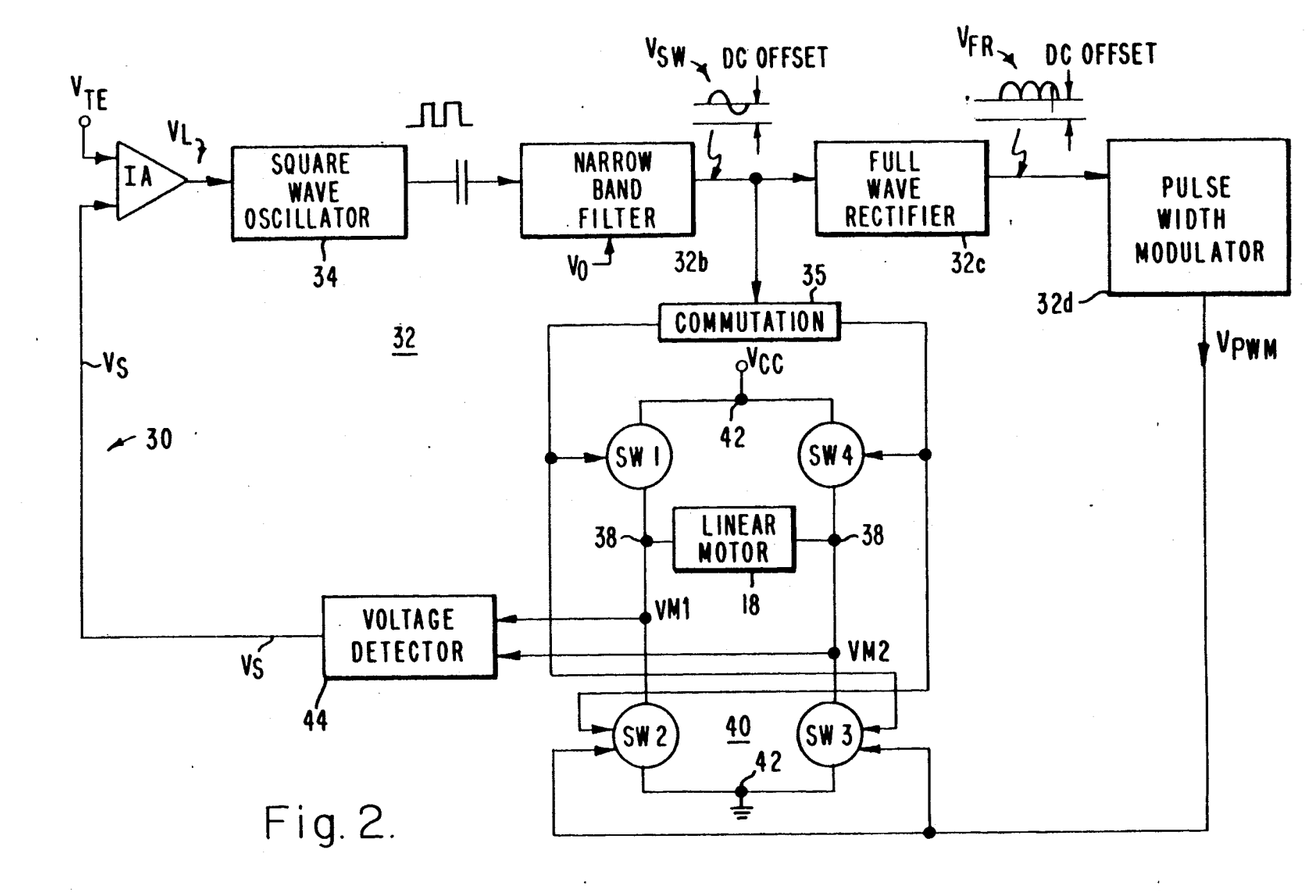
FIG. 2 schematically illustrates additional details of a sine wave drive and voltage control circuitry of the type embodied in FIG. 1.

The voltage control loop 30 controls the power applied to the coil 20. It includes a sine wave drive 32 which, using pulse width modulation, produces a sine wave type of electrical output of constant frequency, the frequency being determined by the frequency of an oscillator 34 and the amplitude being determined by a voltage level signal $V_L$. The oscillator 34 is shown separately in FIG. 1 for clarity in describing its purpose and function. In its preferred position, as seen in FIG. 2, however, the voltage level of the oscillator output, and, hence, of the sine wave drive is controlled by the voltage level signal $V_L$. This sine wave type of electrical power output is commutated in alternating cycles of the oscillator output, at oscillator frequency, across the coil 20 of the linear motor 18, the length of stroke of which is proportional to the amplitude of the sinusoidal current.

In greater detail, the temperature control loop 28 comprises a differential amplifier DA which receives as one input a feedback voltage $V_{TC}$ proportional to the temperature of the coolant or cooler. This feedback voltage $V_{TC}$ is developed by a temperature sensing diode 36, such as commonly located on the detector Dewar or expander, typically a silicon PN junction device, 1N914. The other input to the differential amplifier DA is a temperature reference voltage $V_{TR}$ which represents the desired temperature of the cyrocooler. The difference in these temperature-representing voltages results in a temperature error voltage $V_{TE}$ at the output of amplifier DA. This temperature error voltage $V_{TE}$ is not necessarily zero when the temperature reference voltage $V_{TR}$ and the temperature cooler voltage $V_{TC}$ are equal, but may be some nominal sustaining value to maintain the compressor function at a level at least tending to compensate thermal losses.

The coil 20 of the linear motor 18 is connected across the opposite terminals 38 of a bridge circuit 40, referred to as an H-bridge, comprising an active circuit element, such as a field-effect transistor, in each of its four legs. The field-effect transistors, being well known, are not detailed here, but instead are shown as individual blocks SW1–SW4, in each of the four legs of the H-bridge. These represent the switching function of the individual field effect transistors in controlling the magnitude and the direction of flow of the current coupled to the linear motor 18. A direct current supply voltage $V_{cc}$ is coupled to the input terminals 42 of the bridge circuit. A voltage detector circuit 44, connected across the coil 20 of the linear motor in the bridge circuit, senses the voltage of the coil 20 and produces a feedback voltage $V_S$ which is fed back to one input terminal of an integrating amplifier IA in the voltage control loop. The other input terminal of the integrating amplifier IA receives the temperature error voltage $V_{TE}$. The output of the integrating amplifier IA is a voltage level signal $V_L$ proportional to the difference of the input voltage, which is indicative of the amplitude of the sine wave current supplied to the coil of the linear motor, which is required to provide the length of the stroke of the compressor piston to drive the present coolant temperature, represented by the voltage $V_{TC}$, toward the desired coolant temperature, represented by the temperature reference voltage $V_{TR}$.

The voltage level signal $V_L$ is coupled to and is used by the sine wave drive 32 to generate electrical outputs which constitute or characterize sine wave signals of the required amplitude at the frequency of the oscillator 34. These electrical outputs may be either analog or digital, digital being preferred in a DC-powered drive. These electrical outputs comprise a substantially sinusoidal current having a peak amplitude proportional to the voltage level $V_L$. Two separate consecutive half cycle electrical outputs 32S of the same polarity are shown in this embodiment of the invention for the sine wave drive 32. These separate electrical outputs are coupled to the pairs of transistors SW1, SW3 and SW4, SW2 in the diagonal legs of the bridge circuit 40. These separate electrical outputs, which are synchronous with the oscillator output, are alternately commutated during each half cycle of oscillator output on the pairs of switches SW1, SW3 and SW4, SW2. The frequency of the oscillator is chosen to actuate the armature 16 of the linear motor at resonant frequency of the compressor system, and the amplitude of each half cycle of the sine wave current controls the length of the piston stroke to achieve the required coolant volume rate for temperature regulation of the cryocooler. As will be seen in figures which follow, when the H-bridge is commutated by the oscillator output, a single output circuit of the sine wave drive 32 may be coupled to both transistors SW2 and SW3, these being in alternatively enabled legs of the bridge.

FIG. 2 schematically illustrates additional details of the sine wave drive 32 of FIG. 1, together with a specific technique for commutating the variable amplitude, constant frequency, sine wave electrical output $V_{PWM}$ of the sine wave drive across the coil 20 of the linear motor 18. In this figure, the oscillator 34 is indicated as a square wave oscillator located at the input of the sine wave drive 32. The oscillator receives the voltage level signal $V_L$ from the integrating amplifier IA for the purpose of amplitude control. The output of the square wave oscillator is simply a square wave cyclic voltage having an amplitude determined by the magnitude of the control level voltage $V_L$. The square wave output of this square wave oscillator 34 is coupled to a narrow band filter 32b having a DC offset voltage $V_O$ applied thereto. The DC offset voltage $V_O$ is added to the narrow band filter 22b allowing a sine wave on this single polarity circuit. The narrow band filter circuit 32b converts the square wave voltage produced by the oscillator 34 to a sine wave voltage $V_{SW}$ having the proper amplitude. This sine wave voltage $V_{SW}$ is rectified by a full wave rectifier 32c to produce a full wave rectified, DC offset, sine wave voltage $V_{FR}$, now a single polarity signal of the proper amplitude, which is coupled as input to a pulse width modulator circuit 32d.

The pulse width modulator circuit 32d is conventional. Its purpose, in each half-cycle time period of the input sine wave voltage $V_{FR}$, is to produce a digital, pulse width modulated, electrical output signal $V_{PWM}$ comprising individual rectangular waveforms of constant amplitude, but of differing time duration (width), determined by the amplitude of the full wave rectified sine wave voltages $V_{FR}$ at the input, to digitally simulate or constitute consecutive half cycle sine waves, synchronized with the sine waves $V_{FR}$, having the same time duration as a corresponding half cycle of the sinusoidal input $V_{FR}$ and having a peak amplitude corresponding to the peak amplitude of the corresponding sine wave input $V_{FR}$.

Figure 5:
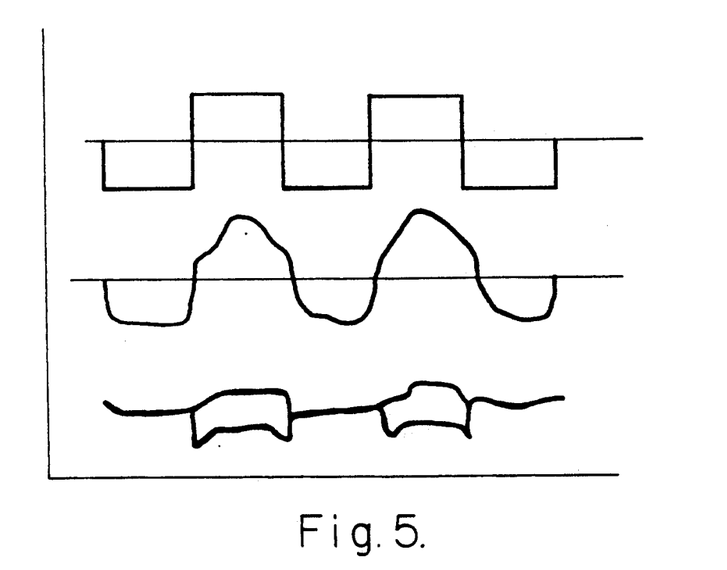
FIG. 5 depicts tracings of a photograph of three electrical signals measured in a system which was tested, having a sine wave drive of the type of FIG. 2.
Figure 6:
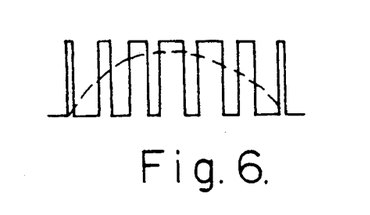
FIGS. 6 and 7 are idealized illustrations of digital simulations of sine waves by means of pulse width modulation.
Figure 7:
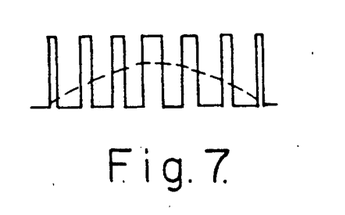

FIG. 5 depicts tracings of photographs of test results of a linear resonant cooler system having a sine wave drive of the type of this FIG. 2. As tested, the square wave oscillator frequency was set at 50 Hz, which was the resonant frequency of the test compressor. In this figure, the upper trace is the commutation pulse across the winding of the linear motor. All that is visible here is the slow commutation rate of the voltage applied to the linear motor winding 20. A pulse width modulation duty cycle was chosen of 100 KHz within each commutation pulse. This, of course, was not visible in the display, and no attempt is made in this illustration to show such pulse width modulation. Simplified representations of pulse width modulation, however, are given in FIGS. 6 and 7, the illustration in FIG. 6 having the greater width of the individual pulses characterizing or constituting a half cycle sine wave, shown dotted, of greater amplitude than that for FIG. 7, for example.

The middle trace in FIG. 5 shows the current pulse derived from the pulse width modulated voltage. This trace is not an idealized sine wave. Its irregularity results in part from the non-linear nature of the linear motor drive and the compressor at large stroke. Although not perfect, it is quite satisfactory for efficient operation. The lower trace in this figure will be discussed at a later point.

Commutation of the H-bridge 40 is provided by a commutation circuit 35 driven by the sine wave voltage $V_{SW}$. One output of the commutation circuit 35 is used to control the switches SW1 and SW3. The other output is used to control the switches SW4 and SW2. By timing these commutation signals with alternate half cycles of the sine wave voltage $V_{SW}$, commutation is synchronized with the pulse width modulated voltage $V_{PWM}$.

Figure 3:
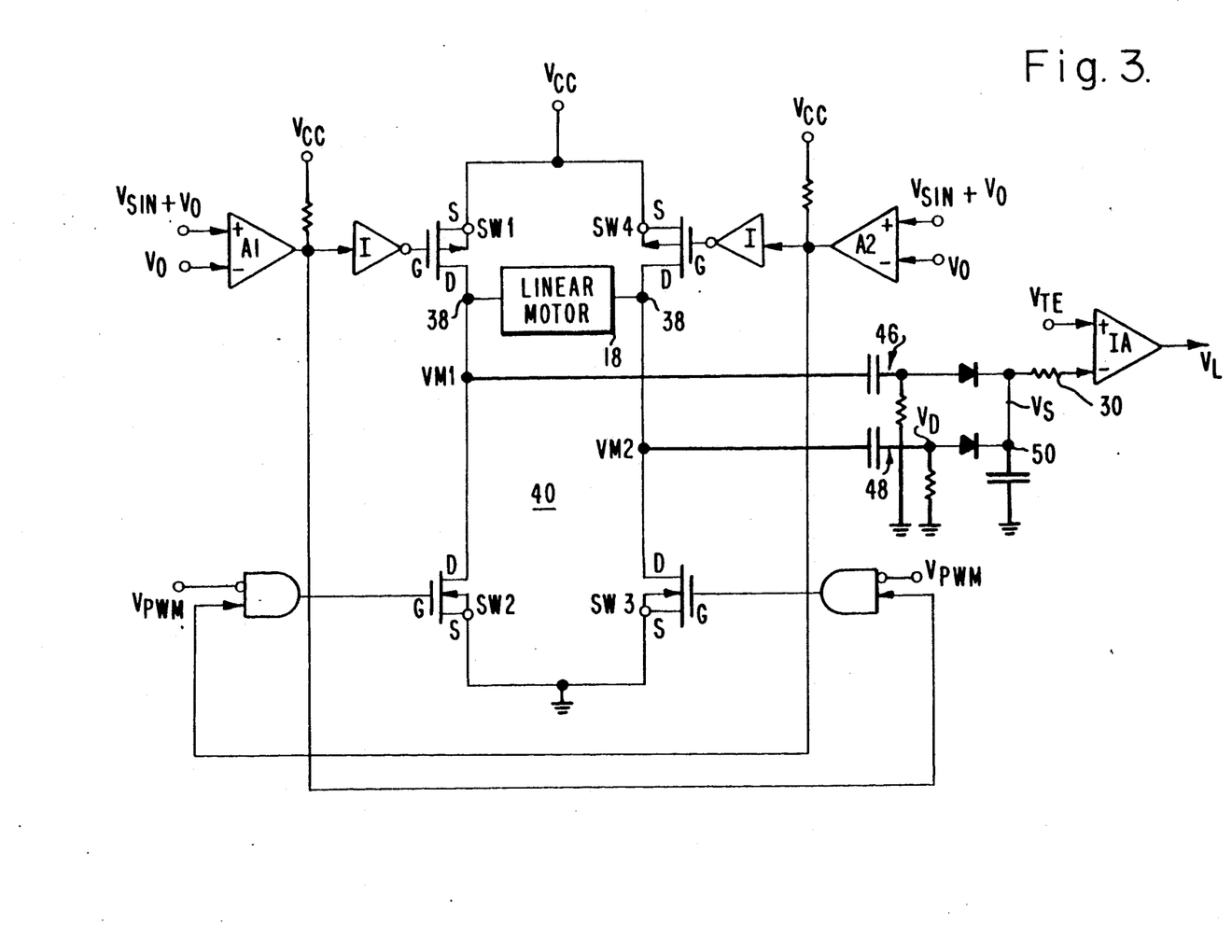
FIG. 3 schematically illustrates a specific example of an H-bridge circuit and a voltage detection circuits, employed in this invention.

The H-bridge drive and the voltage detection circuit are shown in greater detail in FIG. 3. Here, respective differentiator circuits 46 and 48, each comprising a capacitor input, capacitor resistor circuit connected across the bridge circuit, produce differentiated signals $V_D$ at their respective outputs, each having characteristics depicted in the lower trace of FIG. 5. This lower trace shows the signal after the differentiator in the voltage control circuit. The lower trace in FIG. 5 shows the differentiated voltage for the output of only one differentiator circuit. These differentiated signals are integrated at respective integrators 49 and 50, which follow the differentiators in the circuit, to produce the feedback voltage $V_S$ applied to the integrating amplifier IA along with the temperature error voltage $V_{TE}$, to produce the voltage level signal $V_L$ for controlling the power coupled to the coil 20 by means of the amplitude control of the sine wave circuit drive 32.

Details of the circuits of the H-bridge are disclosed in FIG. 3. In this figure, inverters I1 and I2 couple the outputs of amplifiers A1 and A2 to the gate electrodes of P-channel field-effect transistors SW1 and SW4 in the upper adjacent legs of the bridge circuit 40. Amplifiers A1 and A2 receive opposite half cycles of a sine wave voltage, such as the DC offset sine wave voltage at the output of the narrow band filter 32b in FIG. 2. Fixed biases, such as the DC offset voltage $V_O$, are applied in opposite polarity senses to the amplifier inputs, so that one amplifier operates in the presence of the positive half cycle of the sine wave voltage $V_{SW}$ and the other amplifier operates in the presence of the opposite or negative half cycle of the sine wave voltage $V_{SW}$. Gate circuits G1 and G2 each receive the pulse width modulated voltage $V_{PWM}$ on one input terminal. The output of each amplifier A1 and A2 is also connected to a gate-enabling terminal of the respective gate circuits G2 and G1, to gate the pulse width modulated voltages $V_{PWM}$ to the gate terminals of the field effect transistors SW2 and SW3 to which the outputs of the gate circuits G1 and G2 are connected, respectively. In this respect, the output of the amplifier A1 is connected as input to the enabling terminal of the gate circuit G2, and the output of the amplifier A2 is connected as input to the enabling terminal of the gate circuit G1. By these expedients, the field-effect transistors in the opposite or diagonal legs of the bridge circuit are enabled in pairs to reversibly couple the voltage $V_{PWM}$ to the coil 20 of the linear motor.

FIG. 4 illustrates the temperature control loop in greater detail and also shows the single adjustment calibrating potentiometer 52 for calibrating the temperature error voltage $V_{TE}$ at the input of the voltage servo-loop 30. This was referred to in the discussion with respect to FIG. 1. The output of the differential amplifier DA, producing the temperature error voltage $V_{TE}$, is coupled to the potentiometer 52 rather than directly to the input of the integrator amplifier IA, as shown in FIG. 1. The voltage level signal $V_2$, which is the input to the voltage control loop 30, together with the output of the oscillator 34, is used by the sine wave drive 32 to produce the sine wave simulating, pulse width modulated voltage $V_{PWM}$, which is used to drive the linear motor 18, which is here assumed to also include the bridge circuit 40. The feedback voltage $V_S$ is coupled from the linear motor drive to the voltage control loop 30 to close the loop.

The mechanical output of the linear motor drive, drives the cryocooler compressor 1. The temperature sensor 36, being coupled to the differential amplifier DA, closes the temperature control loop. Thus, the temperature voltage $V_{TC}$ which is derived from the temperature sensor 36 at the expander 22, is compared with the temperature reference voltage $V_{TR}$ at the input of the differential amplifier DA. The voltage output of this amplifier DA provides the temperature error voltage $V_{TE}$ for the voltage control loop 30.

The calibrating potentiometer 52 at the output of the differential amplifier DA provides a single adjustment for the maximum amplitude of the temperature error voltage $V_{TE}$ to be coupled to the voltage control circuit 30. This, in turn determines the power applied to the winding of the linear motor which is required to achieve maximum stroke of the compressor piston. The voltage control circuit 30, in providing power to the coil 20, drives the voltage of the coil 20 toward this level. This enables the voltage control circuit to drive a wide spectrum of linear motors. For example, when the temperature is too high, a large sinusoidal current is supplied to the compressor. This causes a large amplitude of oscillation; that is, stroke of the piston, resulting in a relatively large amount of coolant per unit of time being applied to the expander to reduce the temperature in the direction of the reference temperature. When the temperature sensor voltage closely approaches or equals the temperature reference voltage $V_{TR}$, the piston stroke in the compressor is reduced to the point where the volume of the coolant transfer tends to balance the system losses to hold the temperature relatively constant.

Figure 8:
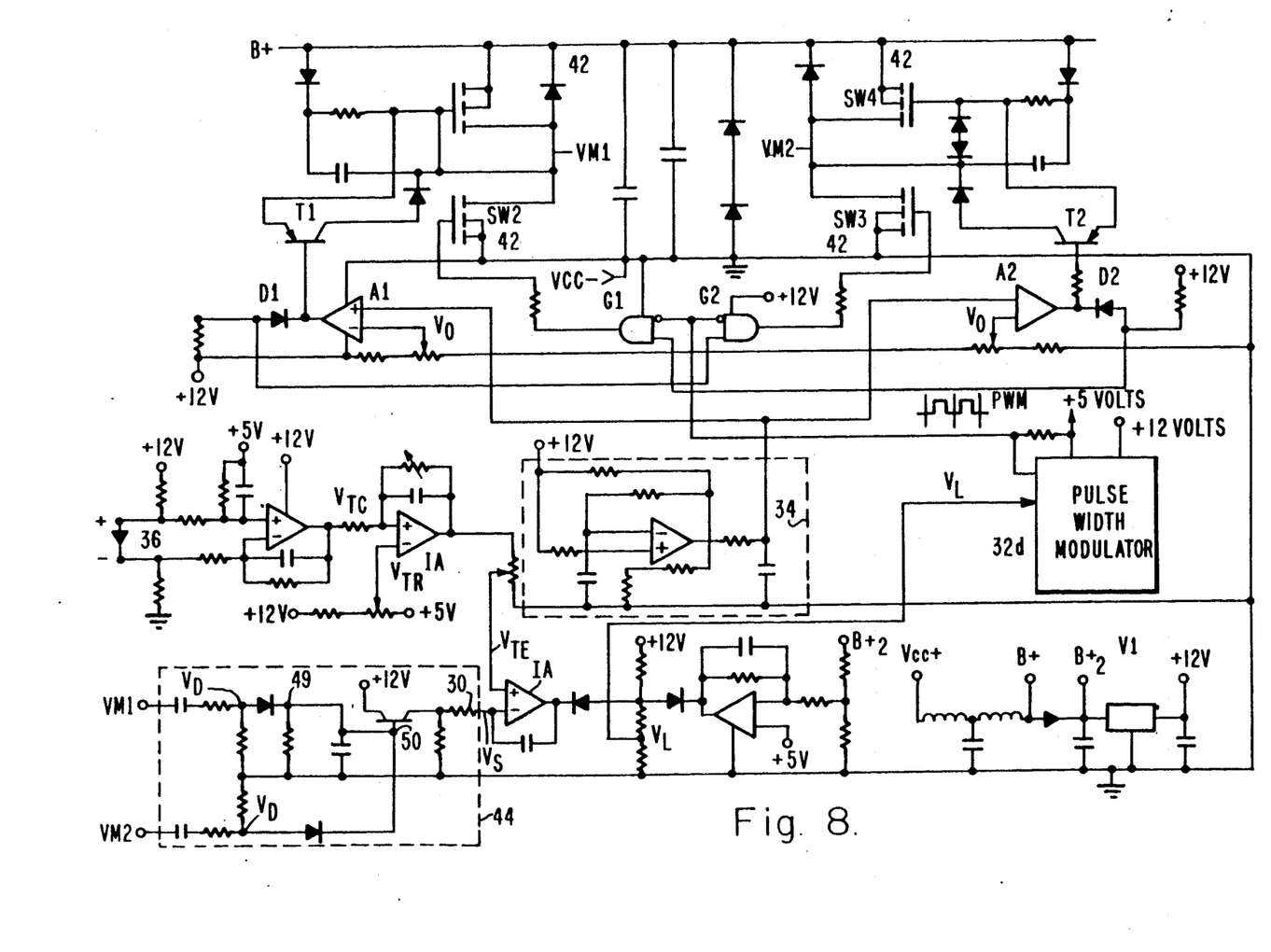
FIG. 8 is a schematic illustration of a further embodiment of this invention showing a modification of the H-bridge circuit and the utilization of a square wave, pulse width modulated, constant duty cycle.

FIG. 8 is a further embodiment of this invention. There are two changes in the circuit of FIG. 8. One is the replacement, in the upper half of the H-bridge, of the P-channel FET's SW1 and SW4 of FIG. 3 with more efficient N-channel FET's, of the type of the FET's SW2 and SW3, as used in the lower half of the H-bridge 40; and the other is the use of a pulse width modulated, constant duty cycle, square wave signal in place of the pulse width modulated sine wave, as employed in FIG. 3.

The embodiment of FIG. 8 is shown in substantially the detail in which it was constructed and tested. Circuit portions, which correspond to those discussed hereinabove, in connection with the sine wave drive, bear the same reference characters. The points in the circuits where the various voltages $V_{TR}$, $V_{TE}$, $V_S$, $V_L$, $V_O$ are developed or applied are marked. The circuit of FIG. 8 is described only in the detail required to clearly present the invention. Other details have been covered in the description of the sine wave drive above, or are conventional and within the skill of those skilled in the art.

With regard to the first change, N-channel field effect transistors SW1 and SW4 have been substituted for the P-channel transistors of FIG. 3, in the upper half of the H-bridge 40. A unique "bootstrap" technique is employed to switch these N-channel transistors, accomplished in the connection of PNP transistors T1 and T2, respectively, across the gate and drain terminals of each of the N-channel FET's SW1 and SW4. The transistors T1 and T2, which as tested are 2N2907 transistors, are controlled by the outputs of amplifiers A1 and A2, respectively, the outputs of which are connected to the base electrodes of these respective transistors. The amplifiers A1 and A2 have positive and negative input terminals marked + and −. An adjustable offset voltage $V_O$ is coupled as input to the negative terminal of amplifier A1 and as input to the positive terminal of amplifier A2, polarizing these amplifiers to operate on alternate half cycles of input to the remaining input terminals from an oscillator 34 having a triangular wave output, as shown.

Switching of the N-channel FET's requires a switching voltage higher than the power supply voltage $V_{CC}$, which, in this case, is 12 volts above that of the voltage VCC, seen as the power supply voltage at the input to the voltage-producing circuit V1 at the bottom right of FIG. 8. Development of this switching voltage is achieved by making each of the transistors T1 and T2 do double duty. First, the transistors T1 and T2, when conducting, each short the gate electrode of the N-channel FET SW1 or SW2 to which it is connected, preventing conduction. Second, when not conducting, the base-emitter junctions of these transistors T1 and T2 act like "voltage doublers," or as a ratchet, to pump the voltage at the gate electrode of the respective one of the N-channel FET's to the level required to switch that FET to conducting state. This has been observed to increase performance, while making it possible to reduce the number of transistors required in the detailed gate circuits (not shown) of the P-channel transistors.

Further simplification of the circuits of this cryocooler system is achieved in the use of the pulse width modulated, constant duty cycle signal $V_{PWM}$. It will be recalled that the voltage level signal $V_L$ developed in the output circuits of the integrating amplifier IA in response to the feedback voltage $V_S$ and the temperature error voltage signal $V_{TE}$, in the circuits of FIG. 1 through FIG. 7, was used to control the power supplied to the coil 20 by controlling the amplitude of the pulse width modulated, digitally simulated, sine wave output of the pulse width modulator 32d, FIG. 2. In the circuit of FIG. 8, however, the pulse width modulator 32 produces a constant amplitude, constant frequency, rectangular wave pulse $V_{PWM}$, under the control of and synchronized with the oscillator 34, via the circuit 34a. This rectangular or square wave signal $V_{PWM}$ is of variable width and is approximately centrally located within each rectangular wave cycle of output of the pulse width modulator 32. This rectangular wave signal $V_{PWM}$ is coupled as input to the inverter input terminals of the AND gates G1 and G2. Gate-enabling voltages are provided by the outputs of amplifiers A1 and A2. These amplifiers, which produce outputs existing in opposite electrical states on alternate half cycles of the output of oscillator 34, are coupled to opposite gates-amplifier A2 to gate G1, and amplifier A1 to gate G2. The outputs of gates G1 and G2 are connected to the gate electrodes of the N-channel FET's SW2 and SW3, respectively.

On the half cycle of output of oscillator 34 that the output of amplifier A1 goes high, the output of amplifier A2 goes low. Transistor T1 is switched off, and transistor T2 conducts. N-channel FET SW1 is gated on by the rising voltage at its gate electrode produced at the base-emitter junction of transistor T1, and N-channel FET SW3 is short-circuited and is switched off by the conducting transistor T2. The voltage at the input of an isolating diode D1, connected between the output of amplifier A2 and 12V, rises, which enables gate G2. The output voltage of amplifier A2 being low lowers the voltage of the input of isolating diode D2, which disables gate G1. Voltage pulse $V_{PWM}$ is now gated by the AND gate G2, which switches the N-channel FET SW3 to conduct within the conducting interval of the N-channel FET SW1. Current flows through the coil of the linear motor 18 in one direction within this conducting interval. The duration of current flow is determined by the width of the gated pulse $V_{PWM}$.

Upon the occurrence of the next half-cycle of output of the oscillator 34, the operational states of the amplifier A1 and A2 are reversed. The gate G2 is disabled and the gate G1 is enabled. Transistor T1 now shorts the N-channel FET SW1, and the transistor T2 is now switched off. The voltage at the base-emitter junction of the transistor T2 switches the N-channel FET SW4 to its conducting state. During the conducting interval of FET SW4, the next occurring pulse $V_{PWM}$ causes the N-channel FET SW2 to conduct, which reverses current flow through the coil of the linear motor 18. The length of the stroke of the linear motor in each direction is a function of the width or the duration of the pulse $V_{PWM}$, which determines the power coupled to the coil 20, during a particular half-cycle of oscillator output.

Figure 9:
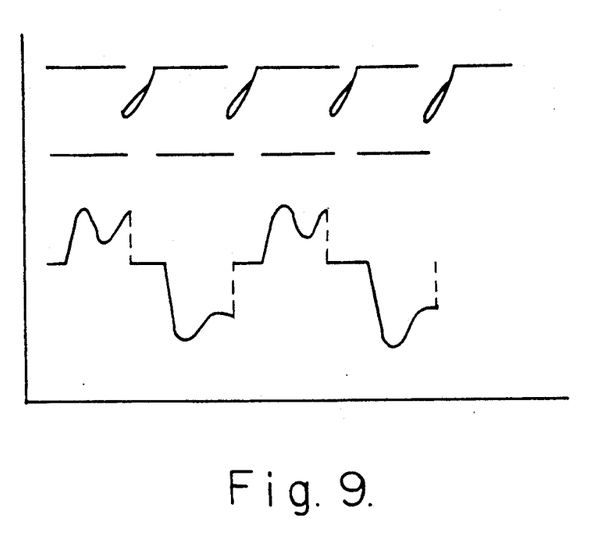
FIG. 9 depicts tracings of a photograph of motor voltage and current in a system having a square wave drive of the type of FIG. 8.

FIG. 9 is a reproduction of a photograph which was taken of the input voltage and current. VM1 and VM2 are the voltages applied to the coil of the linear motor 18. The motor current is shown below. Unlike the case of linear motor control using the sine wave drive, the motor current is high when it is interrupted. Since the motor current is high, there is a higher transient associated with current interruption than exists in the case of the sine wave drive. Temperature measurements at the cryocooler expander and corresponding temperature, representing voltages, closely approximate those observed with the sine wave generator.

INDUSTRIAL APPLICABILITY

This cooler is useful in applications for cooling electronic circuits such as found in satellites, in airborne applications, and in fixed base and ground mobile applications.

What is claimed is:

1. A direct current powered control system for controlling the length of the stroke of a piston of a linear motor compressor for a cryocooler, said motor having an armature member and a stator member, which are magnetically coupled, one of said members comprising a permanent magnet and the other of said members comprising a coil adapted to be reversibly energized, said direct current control system comprising:

a voltage control circuit having a cyclic, pulse width modulated electrical output of a frequency substantially the same as the resonant frequency of the linear motor compressor;

means for reversibly commutating said electrical output across said coil, synchronously with each half cycle of said electrical output;

means for producing a temperature error voltage;

means for producing a feedback voltage proportional to the voltage across said coil; and means for coupling the difference of said temperature error voltage and said feedback voltage as input to said voltage control circuit for controlling the power of each half cycle of said electrical output for controlling the length of the stroke of said piston.

2. A direct current powered control system for controlling the length of the stroke of a piston of a linear motor compressor for a cryocooler, said motor having an armature member and a stator member, which are magnetically coupled, one of said members comprising a permanent magnet and the other of said members comprising a coil adapted to be reversibly energized, said direct current control system comprising:

a voltage control circuit comprising a pulse width modulator for producing a cyclic, pulse width modulated electrical output of substantially constant frequency connected to said coil;

means for sensing the temperature of said cryocooler and producing a temperature error voltage;

means for sensing the voltage of said coil and producing a feedback voltage which is approximately indicative of the length of the stroke of said piston;

means responsive to the difference between said temperature error voltage and said feedback voltage for producing a control voltage substantially indicative of a required length of piston stroke;

means for coupling said control voltage as input to said pulse width modulator to change the power of said cyclic electrical output to control the length of stroke of said piston; and means for reversibly coupling said cyclic electrical output to said coil, synchronously with each half cycle of said cyclic electrical output to reciprocate said piston.

3. The direct current powered control system according to claim 2, in which:
said substantially constant frequency is substantially the resonant frequency of said linear motor compressor.

4. The direct current powered control system according to claim 2, in which:
said means for reversibly coupling comprises a bridge circuit having input terminals for receiving direct current voltage and output terminals connected to said coil;
switch means in each leg of said bridge circuit;
circuit means coupling said cyclic electrical output to said switch means in at least two adjacent legs of said bridge circuit; and
means for enabling said switch means to conduct in one diagonal leg of the bridge circuit and then the other diagonal leg, synchronously with each half cycle of said cyclic electrical output to reversibly energize said coil.

5. The direct current powered control system according to claim 4, in which:
said means for enabling comprises an oscillator for producing an oscillating signal at said substantially constant frequency; and
commutation circuit means responsive to said oscillating signal for producing cyclic commutating signals for controlling said switch means.

6. The direct current powered control system according to claim 5, in which:
said commutation circuit means comprises amplifier circuit means connecting said commutating signals to a first pair of said switch means in adjacent legs of said bridge circuit;
respective gate circuits, each having an output circuit connected to the respective remaining pair of said switch means in the remaining adjacent legs of said bridge circuit;
wherein said circuit means connecting consecutive half cycles of said commutating signals as gate enabling signals, respectively, to said respective gate circuits;
said circuit means also connecting said pulse width modulated electrical output as input to each of said gate circuit to be coupled to said coil in reversible polarity during each half cycle of said commutating signals.

7. The direct current powered control system according to claim 6, in which:
said first pair of switch means each comprise a P-channel field effect transistor and said remaining pair of switch means each comprise an N-channel field effect transistor.

8. The direct current powered control system according to claim 6, in which:
said first pair of switch means each comprise an N-channel field effect transistor and said remaining pair of switch means each comprise an N-channel field effect transistor;
a transistor connected to the gate circuit of each of said first pair of N-channel field effect transistors, and having a base circuit coupled to and controlled by said commutation circuit means to be switched between conducting and non-conducting states in synchronism with said commutation signals, each said transistor when conducting, short circuiting the connected N-channel field effect transistor and when nonconducting having a base-emitter junction voltage characteristic which elevates the gate voltage of the connected N-channel field effect transistor to cause conduction.

9. The direct current powered control system according to claim 8, in which:
each said transistor is a P-N-P transistor which, when non-conducting has a base-emitter junction characteristic which acts like a voltage doubler to pump the voltage applied to the gate of the connected N-channel field effect transistor to a level to cause conduction.

10. The direct current powered control system according to claim 9, in which:
the gate voltage of the connected N-channel field effect transistor exceeds said direct current voltage applied to the input terminals of said bridge circuit.

11. The direct current powered control system according to claim 2, in which:
said pulse width modulator comprises a sine wave drive for producing a pulse width modulated sine wave simulating signal in each half cycle of said electrical output.

12. The direct current powered control system according to claim 11, in which:
said sine wave simulating signal is of the same polarity in each half cycle of said electrical output.

13. The direct current powered control system according to claim 2, in which:
said pulse width modulator comprises a square wave drive producing a pulse width modulated square wave simulating signal within each half cycle of said electrical output.

14. The direct current powered control system according to claim 13, in which:
said pulse width modulated square wave pulse is of the same polarity and magnitude in each half cycle of said electrical output.

* * * * *